United States Patent [19]

Yamamoto et al.

[11] Patent Number: 5,388,855
[45] Date of Patent: Feb. 14, 1995

[54] SUSPENSION SYSTEM OF A VEHICLE

[75] Inventors: Tadanobu Yamamoto; Hiroyoshi Kumada, both of Hiroshima, Japan

[73] Assignee: Mazda Motor Corporation, Hiroshima, Japan

[21] Appl. No.: 248,827

[22] Filed: May 24, 1994

Related U.S. Application Data

[63] Continuation of Ser. No. 005,930, Jan. 19, 1993, abandoned, which is a continuation of Ser. No. 674,450, Mar. 25, 1991, abandoned.

[30] Foreign Application Priority Data

Mar. 30, 1990 [JP] Japan .................. 2-91390

[51] Int. Cl.$^6$ .................. B60G 3/20
[52] U.S. Cl. .................. 280/675; 280/691
[58] Field of Search .................. 280/96.1, 95.1, 660, 280/688, 691, 673, 675, 846

[56] References Cited

U.S. PATENT DOCUMENTS

| | | | |
|---|---|---|---|
| 3,942,816 | 3/1976 | Scherenberg et al. | 280/673 |
| 4,440,420 | 4/1984 | Müller | 280/660 |
| 4,448,441 | 5/1984 | Brümmer et al. | 280/691 |
| 4,819,959 | 4/1989 | Inoue et al. | 280/660 |
| 4,978,131 | 12/1990 | Edahiro et al. | 280/675 |
| 5,048,860 | 9/1991 | Kanai et al. | 280/660 |

FOREIGN PATENT DOCUMENTS

| | | |
|---|---|---|
| 265959 | 5/1988 | European Pat. Off. . |
| 1938850 | 5/1970 | Germany . |
| 3826930 | 3/1989 | Germany . |
| 64-26507 | 2/1989 | Japan . |
| 2106460 | 4/1983 | United Kingdom . |

*Primary Examiner*—Kenneth R. Rice
*Assistant Examiner*—Paul N. Dickson
*Attorney, Agent, or Firm*—Keck, Mahhin & Cate

[57] ABSTRACT

A suspension system for vehicle includes a steering knuckle for supporting a wheel used for steering, a steering arm connected to the steering knuckle at one end thereof and to a tie rod of a steering device at an opposite end thereof, an upper arm for connecting an upper portion of the steering knuckle to a frame of the vehicle, and a lower arm for connecting a lower portion of the steering knuckle to a frame of the vehicle. At least one of the arms includes two link members, and each of the link members is pivotally connected to the frame of the vehicle at one end thereof and to the steering knuckle at an opposite end thereof. The link members are so disposed as to increase a distance between the connection point of the steering arm with the tie rod and a kingpin axis in response to an increase in a turning angle of the wheel used for steering when the wheel is turned toward an outward direction in which the wheel is located radially outwardly in relation to a turning circle. The ink members also reduce their distance in response to an increase in a turning angle of the wheel when the wheel is turned toward an inward direction in which the wheel is located radially inwardly in relation to the turning circle.

6 Claims, 7 Drawing Sheets

SUSPENSION SYSTEM OF A VEHICLE

This is a continuation of application Ser. No. 08/005,930, filed Jan. 19, 1993, abandoned, which is a continuation of application Ser. No. 07/674,450, filed Mar. 25, 1991, abandoned.

BACKGROUND OF THE INVENTION

1. Field of the Invention

The present invention relates to a suspension system for anchoring wheels used for steering to a frame of a vehicle.

2. Description of Related Art

Hereinafter, a fore-to-aft direction of the vehicle is referred to as a longitudinal direction, and a side-to-side direction of the vehicle is referred to as a transverse direction. Also, a location near a centerline of the vehicle is referred to as an inside location, and a location distant from a centerline of the vehicle is referred to as an outside location.

A double pivot type suspension system for a vehicle is known. For example, Japanese Utility Model Laid-Open publication No. 64-26507 shows such a type of suspension system. This type of suspension system comprises a steering knuckle for supporting a wheel, and an upper arm and a lower arm respectively connecting an upper portion and a lower portion of the steering knuckle to a frame of a vehicle. At least one of the arms comprises two link members, each of which is pivotally connected to the frame at one respective end thereof, and to the steering knuckle at an opposite respective end thereof.

In this type of suspension system, a kingpin axis, which is an axis around which a wheel used for steering is turned, extends through a cross point between the axes of the two link members. The kingpin axis moves in response to movement of the cross point in a horizontal plane during steering of the vehicle.

When the vehicle is turned, a wheel which is located radially inwardly in relation to a turning circle must be turned more sharply than a wheel which is located radially outwardly in relation to the turning circle. This principle is known as the ACKERMAN PRINCIPLE. The ACKERMAN PRINCIPLE has previously been achieved by differentiating a transverse inclination in a horizontal plane of a tie rod for the wheel which is located radially inwardly in relation to a turning circle from that of a tie rod for the wheel which is located radially outwardly in relation to the turning circle. However, this may cause a problem in which the length of the tie rod and the position of a rack for driving the tie rod are restricted, so that the degree of design freedom regarding the steering system is reduced.

SUMMARY OF THE INVENTION

It is therefore, the object of the present invention to provide a double pivot type suspension system for a vehicle in which the ACKERMAN PRINCIPLE is achieved by using the movement of the kingpin axis during steering of the vehicle so that the degree of design freedom regarding the steering system is increased.

In accordance with the present invention, there is provided a suspension system for a vehicle which includes a steering knuckle for supporting a wheel used for steering, a steering arm connected to the steering knuckle at one end thereof and to a tie rod of a steering device at an opposite end thereof, an upper arm for connecting an upper portion of the steering knuckle to a frame of the vehicle, and a lower arm for connecting a lower portion of the steering knuckle to the frame. At least one of the arms includes two link members. Each of the link members is pivotally connected to the frame of the vehicle at one end thereof and to the steering knuckle at an opposite end thereof. The link members are disposed so as to increase a distance between the connection point of the steering arm with the tie rod and a kingpin axis in response to an increase in a turning angle of the wheel used for steering when the wheel is turned toward an outward direction in which the wheel is located radially outwardly in relation to a turning circle. The link members also are disposed so as to reduce this distance in response to an increase in a turning angle of the wheel when the wheel is turned toward an inward direction in which the wheel is located radially inwardly in relation to the turning circle.

In a preferable embodiment of the present invention, the upper arm includes the two link members. One of the link members is disposed in a transverse direction, and the other link member is disposed in a longitudinal direction. The two link members are disposed such that, in a plan view, a forwardly extended portion of an axis of the longitudinally disposed link member crosses an axis of the transversely disposed link member, with the cross point between the axis of the longitudinally disposed link member and the axis of the transversely disposed link member being located, during turning of the wheel used for steering, in front of a vertical plane which includes the connection point of the steering arm with the tie rod and extends in a transverse direction. The steering arm is located to the rear of the center of the wheel used for steering.

In another preferable embodiment of the present invention, the upper arm includes the two link members. One of the link members is disposed in a transverse direction, and the other link member is disposed in a longitudinal direction. The two link members are disposed such that, in a plan view, an axis of the longitudinally disposed link member crosses an axis of the transversely disposed link member when the wheel used for steering is in a neutral position. The cross point between the axis of the longitudinally disposed link member and the axis of the transversely disposed link member is located, during turning of the wheel used for steering, in front of a vertical plane which includes the connection point of the steering arm with the tie rod and extends in a transverse direction. The steering arm is located to the rear of the center of the wheel used for steering.

In still another preferable embodiment of the present invention, the lower arm includes the two link members. One of the link members is disposed in a transverse direction, and the other link member is disposed in a longitudinal direction. The two link members are disposed such that, in a plan view, a forwardly extended portion of an axis of the longitudinally disposed link member crosses a portion of an axis of the transversely disposed link member extended toward the outside of the vehicle. The cross point between the axis of the longitudinally disposed link member and the axis of the transversely disposed link member is located, during turning of the wheel used for steering, to the rear of a vertical plane which includes the connection point of the steering arm with the tie rod and extends in a transverse direction. The steering arm is located in front of the center of the wheel used for steering.

In another preferable embodiment of the present invention, the lower arm includes the two link members, one of the link members being disposed in a transverse direction. The other link member is disposed in a longitudinal direction, and the two link members are disposed such that, in a plan view, an axis of the longitudinally disposed link member crosses a portion of an axis of the transversely disposed link member extended toward the outside of the vehicle when the wheel used for steering is in a neutral position. The cross point between the axis of the longitudinally disposed link member and the axis of the transversely disposed link member is located, during turning of the wheel used for steering, to the rear of a vertical plane which includes the connection point of the steering arm with the tie rod and extends in a transverse direction. The steering arm is located in front of the center of the wheel used for steering.

According to the features of the present invention, the two link members are so disposed as to increase a distance between the connection point of the steering arm with the tie rod and a kingpin axis in response to an increase in a turning angle of the wheel used for steering when the wheel is turned toward an outward direction in which the wheel is located radially outwardly in relation to a turning circle. The two link members are also disposed so as to reduce the distance in response to an increase in a turning angle of the wheel when the wheel is turned toward an inward direction in which the wheel is located radially inwardly in relation to the turning circle. As a result, the turning angle of the wheel which is located radially inwardly in relation to a turning circle becomes larger than that of the wheel which is located radially outwardly in relation to a turning circle. In other words, the wheel which is located radially inwardly in relation to a turning circle is turned more sharply than a wheel which is located radially outwardly in relation to the turning circle. Thus, the ACKERMAN PRINCIPLE is achieved.

DESCRIPTION OF THE PREFERRED EMBODIMENTS

Figure 1:
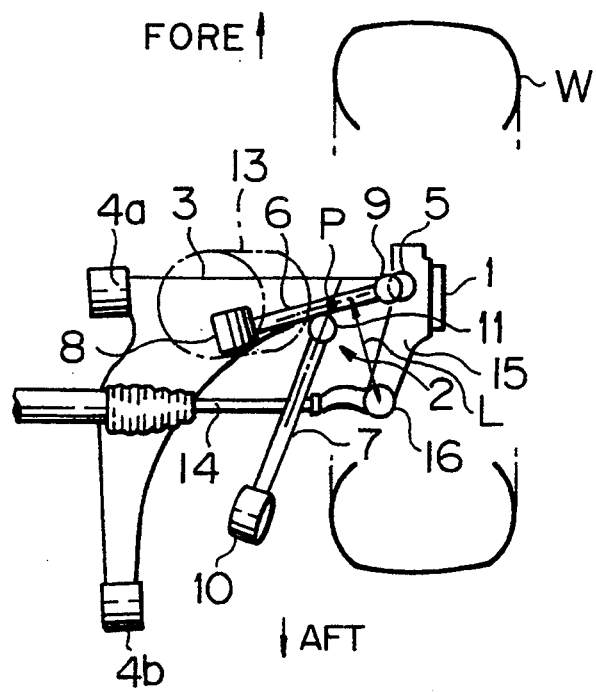
FIG. 1 is a plan view of a suspension system in accordance with a first embodiment of the present invention.
Figure 2:
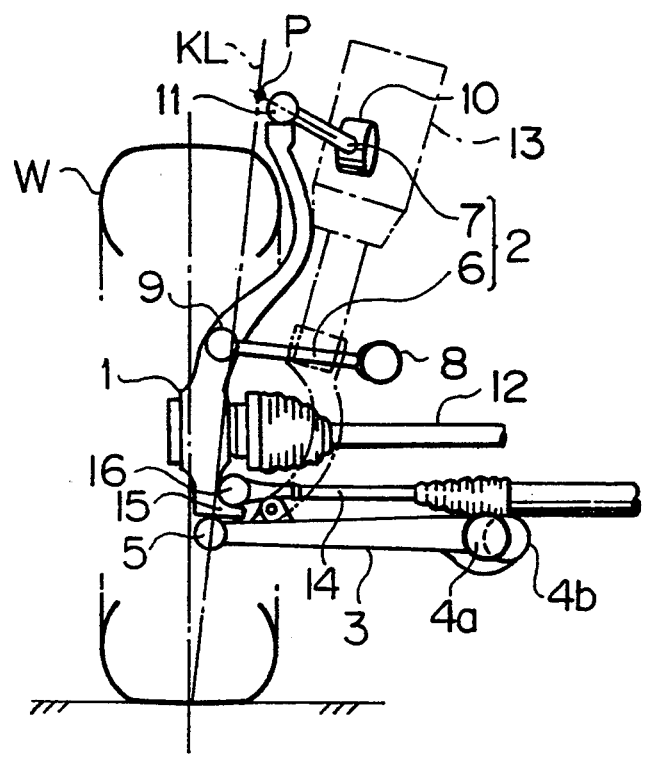
FIG. 2 is a front view of a suspension system in accordance with the first embodiment of the present invention.
Figure 3:
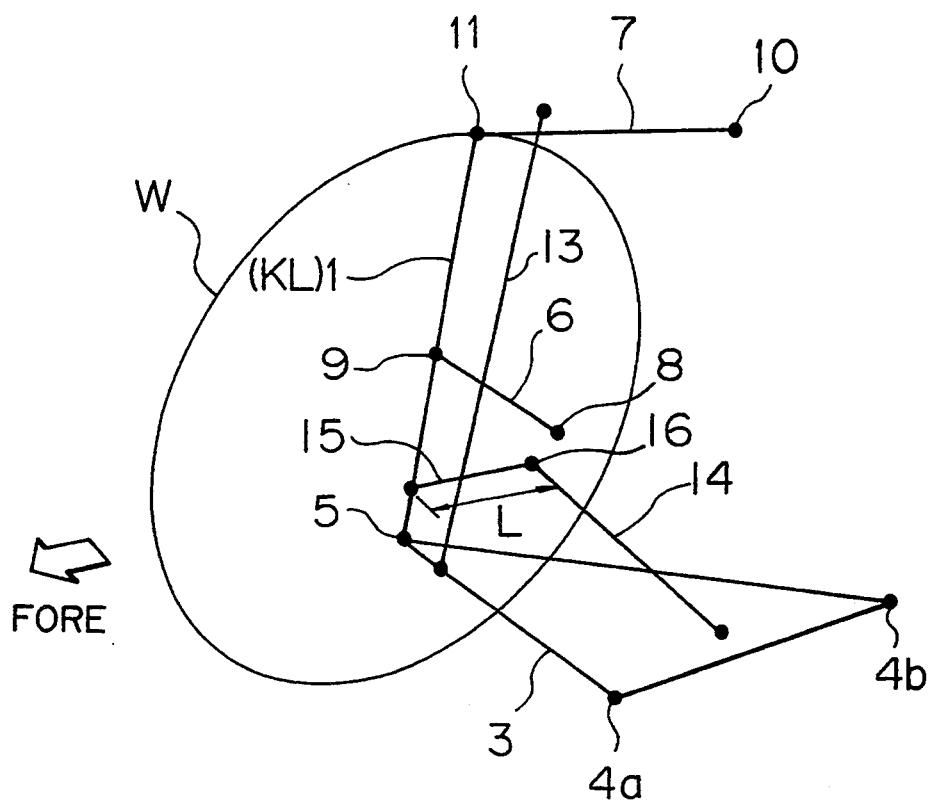
FIG. 3 is a schematic perspective view showing a general arrangement of the suspension system of a first embodiment of the present invention.

Referring to FIGS. 1 to 3, there is shown a suspension system according to a first embodiment of the present invention. The suspension system is for anchoring a right front wheel W, which is a wheel used for steering, of a FF (front-engine-front-drive) vehicle, to the frame of the vehicle.

In FIGS. 1 to 3, a steering knuckle 1 supporting the wheel W is connected to and supported by the frame of the vehicle (not shown) at an upper portion thereof through an upper arm 2, while being connected to and supported by the frame of the vehicle (not shown) at a lower portion thereof through a lower arm 3. The lower arm 3 has an A shaped configuration. Two end points of the A shaped lower arm 3 are aligned in substantially a longitudinal direction of the vehicle, and respectively connected to and supported by the frame of the vehicle for vertical pivotal motion through rubber bushings 4a, 4b. The apex of the A shaped lower arm 3 is rotatably connected to the steering knuckle 1 through a ball joint 5. The upper arm 2 comprises two link members 6, 7. The link member 6 is disposed in substantially a transverse direction of the vehicle. The link member 6 is connected to the frame of the vehicle through a rubber bush 8 at one end thereof and pivotally connected to the steering knuckle 1 through a ball joint 9 at an opposite end thereof. The link member 7 is disposed above the link member 6 and in substantially a longitudinal direction of the vehicle. The link member 7 is connected to the frame of the vehicle through a rubber bush 10 at one end thereof and pivotally connected to the steering knuckle 1 through a ball joint 11 at an opposite end thereof. As shown in FIG. 1, in a plan view, the link member 7 is disposed such that its axis, when extended forward, crosses an axis of the link member 6 at point P on the axis of the link member 7. Moreover, the link member 7 is located to the rear of the cross point P in relation to the longitudinal direction of the vehicle. Though not shown in FIG. 1, the rubber bushes 8, 10, respectively, comprise an inner cylinder, an outer cylinder and a rubber placed into a space between the two cylinders. Thus, the link members 6, 7 can pivot horizontally within a limited angle determined by the resiliency of the rubber bushes 8, 10, and they can rotate around the axes of the rubber bushes 8 and 10, so that they can pivot upward and downward.

In FIG. 1, there is also shown a drive shaft 12 and a shock absorber 13. The shock absorber 13 is connected to the lower arm 3 at a lower end thereof and, to the frame of the vehicle at an upper end thereof. A tie rod 14 Of the steering system is connected to a steering arm 15 protruding rearwardly from the steering knuckle 1 through a ball joint 16. Thus, under a steering force provided through the tie rod 14, the front wheel W, integrally with the steering knuckle 1, turns around a kingpin axis KL.

The kingpin axis KL extends from a cross point between the lower arm 3 and the steering knuckle 1, i.e., the center of the ball joint 5, to the point P on the axis of the link member 7 where, in a plan view, the axis of the link member 6 and the axis of the link member 7 cross each other. A distance L between the kingpin axis KL and the center of the connection point between the steering arm 15 and the tie rod 14, i.e., the center of the ball joint 16, varies as the cross point P moves in response to the turning of the front wheel W.

Figure 4:
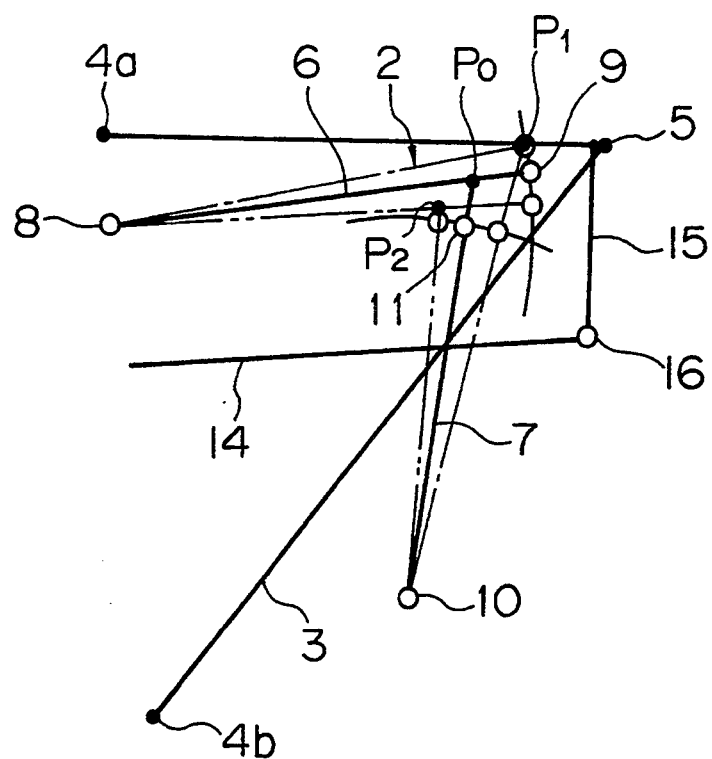
FIG. 4 is a schematic plan view of the arrangement of FIG. 3.
Figure 5:
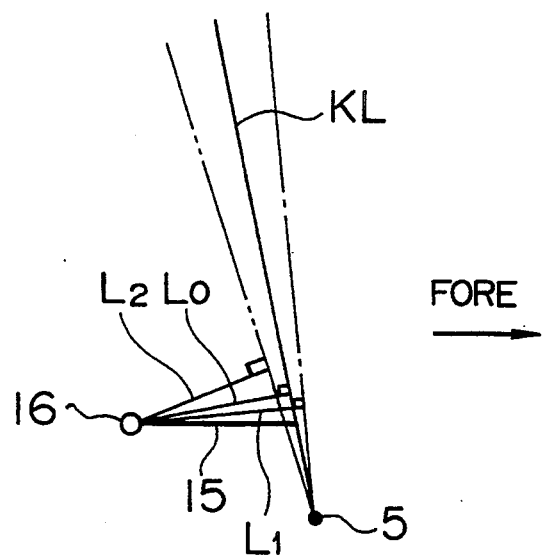
FIG. 5 is a side view showing a movement of a kingpin axis in the first embodiment.

The variation of the distance L in response to the turning of the front wheel W will be described hereinafter with reference to FIGS. 4 and 5. In FIGS. 4 and 5, the link members 6, 7 are indicated by solid lines when the front wheel W is in the neutral position, by dashed lines when the front wheel W is turned in a direction wherein the wheel W is positioned radially outwardly in relation to a turning circle of the vehicle, that is, the front wheel W is turned so as to turn the vehicle to the left in this embodiment; hereinafter this direction will be called an outward direction. The link members are further indicated by two-dot chain lines when the front wheel W is turned in a direction wherein the wheel W is positioned radially inwardly in relation to a turning circle of the vehicle, that is, the front wheel W is turned so as to turn the vehicle to the right in this embodiment; hereinafter this direction will be called an inward direction.

As understood from FIG. 4, the link members 6, 7 of the upper arm 2 horizontally pivot around their respective connection points to the frame of the vehicle, i.e., the rubber bushes 8, 10, in response to the turning of the front wheel W. Thus the cross point P between the link members 6 and 7 moves along the axis of the link member 6. More specifically, when the front wheel W is turned to the outward direction from the neutral position, the cross point P moves to the outside of the vehicle along the link member 6 ($P_0$ to $P_1$). When the front wheel W is turned to the inward direction from the neutral position, the cross point P moves to the inside of the vehicle along the link member 6 ($P_0$ to $P_2$). Link members 6, 7 are so disposed as to, during turning, locate the cross point P in front of a vertical plane which includes the connection point 16 between the steering arm 15 and the tie rod 14 and extends in a transverse direction.

Figure 6:
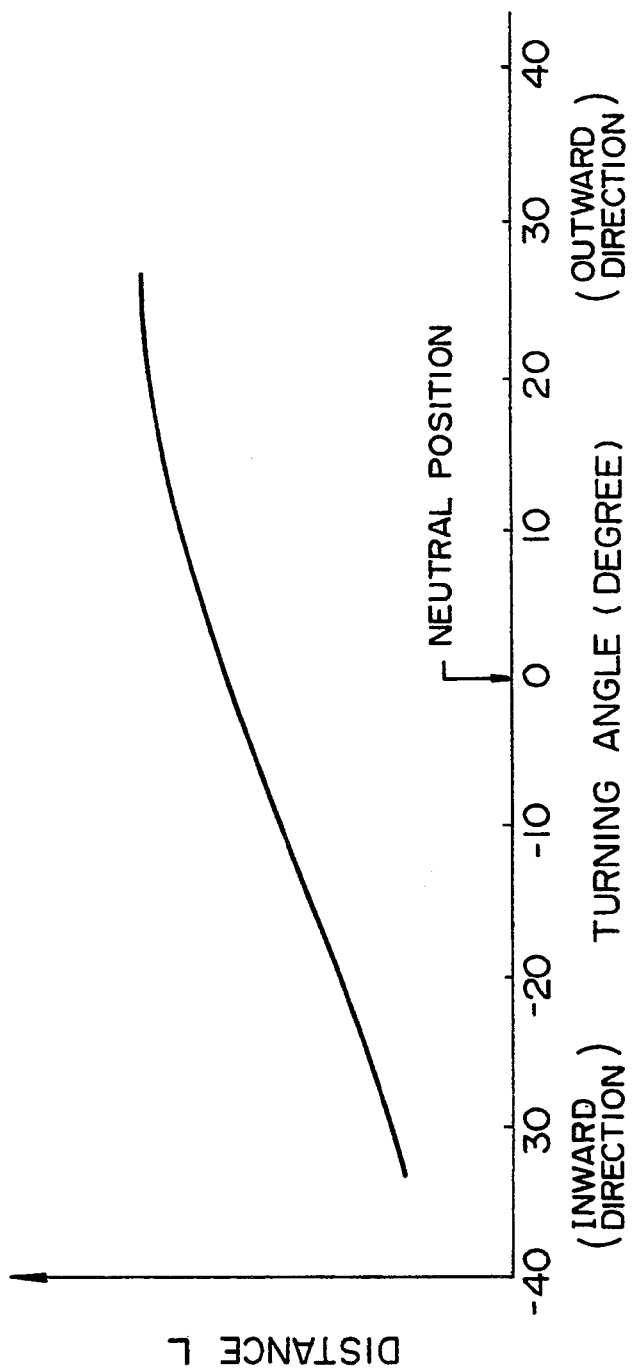
FIG. 6 is a diagram showing variations in a distance between a kingpin axis and a connection point of a steering arm with a tie rod.

Thus, as shown in FIG. 5, the kingpin axis KL longitudinally pivots around the center of the connection point of the lower arm 3 with the steering knuckle 1, i.e., the center of the ball joint 5, in response to the turning of the wheel W. The distance L between the kingpin axis and the connection point 16 increases when the front wheel W is turned to the outward direction from the neutral position ($L_0$ to $L_1$), while it decreases when the front wheel W is turned to the inward direction from the neutral position ($L_0$ to $L_2$). As a result, as shown in FIG. 6, the distance L gradually increases in response to the increase in the turning angle when the front wheel is turned to the outward direction, while it gradually decreases in response to the increase in the turning angle when the front wheel is turned to the inward direction.

As described above, link members 6, 7 are so disposed as to increase the distance L between the kingpin axis KL and the connection point 16 between the steering arm 15 and the tie rod 14 in response to the increase in the turning angle when the front wheel W is turned to the outward direction and decrease the distance L in response to the increase in the turning angle when the front wheel W is turned to the inward direction. As a result, the turning angle of the wheel which is located radially inwardly in relation to a turning circle becomes larger than that of the wheel which is located radially outwardly in relation to a turning circle. In other words, the wheel which is located radially inwardly in relation to a turning circle is turned more sharply than a wheel which is located radially outwardly in relation to the turning circle. Thus, the ACKERMAN PRINCIPLE can be achieved without differentiating the transverse inclinations of the tie rods, so that the degree of design freedom regarding the steering system can be increased.

Figure 7:
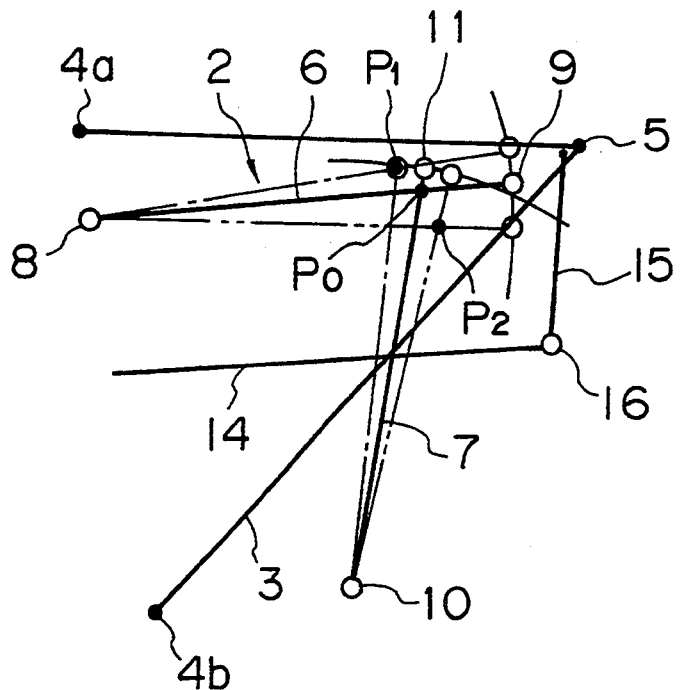
FIG. 7 is a schematic plan view of a general arrangement of a suspension system of a second embodiment of the present invention.

FIG. 7 shows a second embodiment of the present invention. The arrangement of the suspension system in this embodiment is almost the same as in the first embodiment. However, in this embodiment, the link members 6, 7 which define the upper arm 2 are disposed such that, in a plan view, the axis of the link member 7 crosses the axis of the link member 6 when the front wheel W is in the neutral position.

Figure 8:
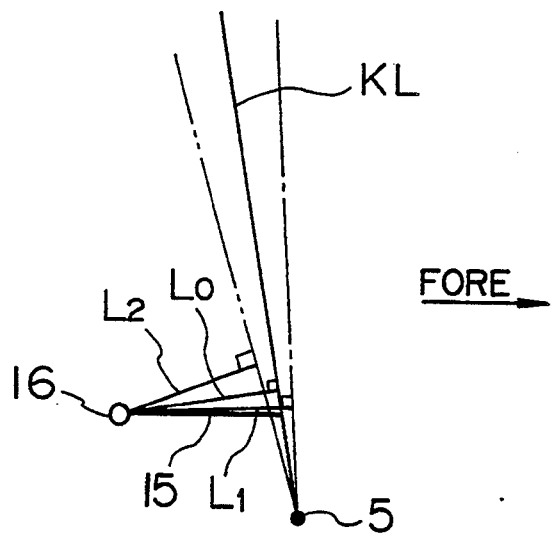
FIG. 8 is a side view showing a movement of a kingpin axis in the second embodiment.

By this arrangement, the cross point P between the link members 6 and 7 moves along the axis of the link member 6 in the same manner as the first embodiment so that, as shown in FIG. 8, the kingpin axis KL longitudinally pivots around the center of the connection point of the lower arm 3 with the steering knuckle 1, i.e., the center of the ball joint 5, in response to the turning of the wheel W. As a result, the distance L between the kingpin axis and the connection point 16 increases when the front wheel W is turned to the outward direction from the neutral position ($L_0$ to $L_1$), while it decreases when the front wheel W is turned to the inward direction from the neutral position ($L_0$ to $L_2$). Thus, the ACKERMAN PRINCIPLE can be achieved.

Figure 9:
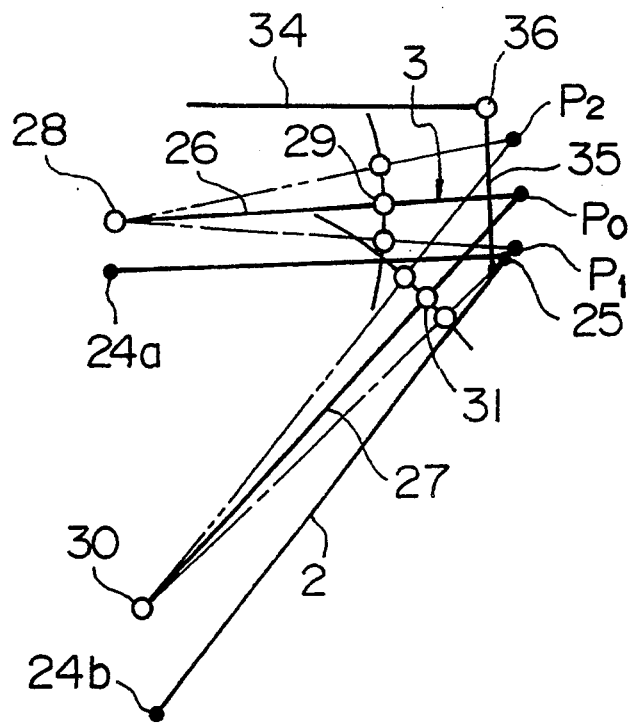
FIG. 9 is a schematic plan view of a general arrangement of a suspension system of a third embodiment of the present invention.

FIG. 9 shows a third embodiment of the present invention. In this embodiment, the upper arm 2 has an A shaped configuration. Two end points of the A shaped upper arm 2 are aligned in substantially a longitudinal direction of the vehicle, and respectively connected to and supported by the frame of the vehicle for vertical pivotal motion through rubber bushings 24a, 24b. The apex of the A shaped upper arm 2 is rotatably connected to the steering knuckle 1 (not shown) through a ball joint 25. The lower arm 3 comprises two link members 26, 27. The link member 26 is disposed in substantially a transverse direction of the vehicle. The link member 26 is connected to the frame of the vehicle through a rubber bush 28 at one end thereof and pivotally connected to the steering knuckle 1 through a ball joint 29 at an opposite end thereof. The link member 27 is disposed longitudinally and obliquely. The link member 27 is connected to the frame of the vehicle through a rubber bush 30 at one end thereof and pivotally connected to the steering knuckle 1 through a ball joint 31 at an opposite end thereof. As shown in FIG. 9, in a plan view, the link members 26 and 27 are disposed such that, when the link member 27 is extended forwardly and the link member 26 is extended toward the outside of the vehicle, they cross each other at point P. Moreover, the link member 27 is located to the rear of the cross point P in relation to the longitudinal direction of the vehicle.

A tie rod 34 of the steering system is connected to a steering arm 35 protruding forwardly from the steering knuckle 1 through a ball joint 36. Link members 26, 27 are so disposed as to, during turning, locate the cross point P to the rear of a vertical plane which includes the connection point of the steering arm 35 with the tie rod 34, i.e., the ball joint 36, and extends in transverse direction.

Figure 10:
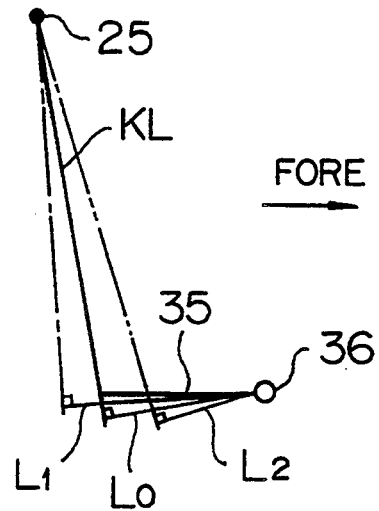
FIG. 10 is a side view showing a movement of a kingpin axis in the third embodiment.

Thus, as understood from FIG. 9, the cross point P between the link members 26 and 27 moves rearwardly ($P_0$ to $P_1$) when the front wheel W is turned to the outward direction. When the front wheel W is turned to the inward direction, the cross point P moves forward ($P_0$ to $P_2$). As a result, as shown in FIG. 10, the kingpin axis KL longitudinally pivots around the center of the connection point of the upper arm 2 with the steering knuckle 1, i.e., the center of the ball joint 25, in response to the turning of the wheel W, so that the distance L between the kingpin axis and the connection point 36 increases when the front wheel W is turned to the outward direction from the neutral position ($L_0$ to $L_1$), while it decreases when the front wheel W is turned to the inward direction from the neutral position ($L_0$ to $L_2$). Thus, the ACKERMAN PRINCIPLE can be achieved without differentiating the transverse inclinations of the tie rods, so that the degree of design freedom regarding the steering system can be increased.

Figure 11:
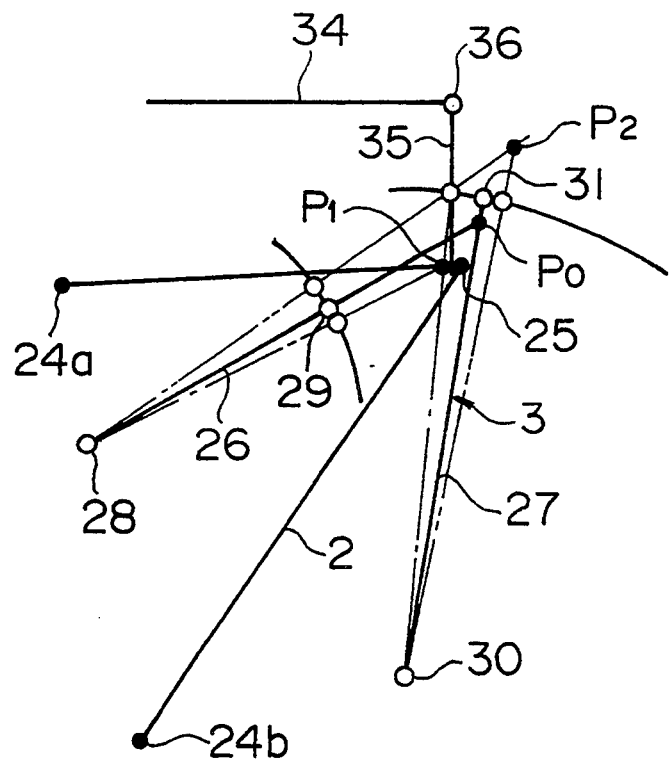
FIG. 11 is a schematic plan view of a general arrangement of a suspension system of a fourth embodiment of the present invention.

FIG. 11 shows a fourth embodiment of the present invention. The arrangement of the suspension system in this embodiment is almost the same as in the third embodiment. However, in this embodiment, the link members 26, 27 which define the lower arm 3 are disposed such that, in a plan view, the axis of the link member 26, when extended toward the outside of the vehicle, crosses the axis of the link member 27 in the neutral position.

Figure 12:
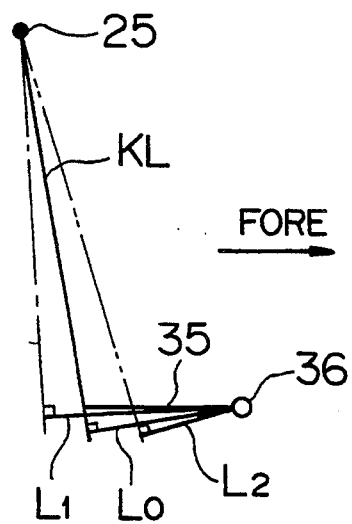
FIG. 12 is a side view showing a movement of a kingpin axis in the fourth embodiment.

By this arrangement, as understood from FIG. 11, the cross point P between the link members 26 and 27 moves rearwardly ($P_0$ to $P_1$) when the front wheel W is turned to the outward direction in the same manner as in the third embodiment. When the front wheel W is turned to the inward direction, the cross point P moves forward ($P_0$ to $P_2$). As a result, as shown in FIG. 12, the kingpin axis KL longitudinally pivots around the center of the connection point of the upper arm 2 with the steering knuckle 1, i.e., the center of the ball joint 25, in response to the turning of the wheel W, so that the distance L between the kingpin axis and the connection point 36 increases when the front wheel W is turned to the outward direction from the neutral position ($L_0$ to $L_1$), while it decreases when the front wheel W is turned to the inward direction from the neutral position ($L_0$ to $L_2$). Thus, the ACKERMAN PRINCIPLE can be achieved without differentiating the transverse inclinations of the tie rods, so that the degree of design freedom regarding the steering system can be increased.

We claim:

1. A suspension system for a vehicle comprising:
   a steering knuckle for supporting a wheel used for steering;
   a steering arm connected to the steering knuckle at one end thereof and to a tie rod of a steering device by a joint located rearward of a center of said wheel and at an opposite end thereof;
   at least two link members for connecting an upper portion of the steering knuckle to a frame of the vehicle, said link members having longitudinal central axes crossing each other at an axis cross point in a plan view of the suspension system;
   a lower arm attached to said steering knuckle at a lower cross point, said lower cross point and said axis cross point defining a kingpin axis extending therethrough, said lower arm connecting a lower portion of the steering knuckle to a frame of the vehicle;
   first means, at one end of each of said link members, for pivotally connecting each of said link members to the frame of the vehicle; and
   second means, at an opposite end of each of said link members, for pivotally connecting each of said link members to the steering knuckle,
   the first means at the one end of one of said link members positioned rearward of the longitudinal central axis of an other of said link members and the second means at the opposite end of the one of said link members positioned forward of the longitudinal central axis of the other of said link members when the wheel is in a neutral position,
   each of said link members being disposed so that said link members pivot around said first means and said second means to move the axis cross point along said longitudinal axes to (a) increase a distance between said joint located at the opposite end of the steering arm and said kingpin axis in response to an increase in a turning angle of the wheel toward an outward direction when the wheel is located radially outwardly in relation to a turning circle and (b) reduce said distance in response to an increase in a turning angle of the wheel toward an inward direction when the wheel is located radially inwardly in relation to the turning circle.

2. A suspension system as defined by claim 1, wherein said lower arm has an A-shaped configuration.

3. A suspension system as defined by claim 1, wherein said steering knuckle extends upwardly so as to have an upper end and an intermediate portion, said one of said link members being pivotally connected by the second means thereof to said upper end and said other of said link members being connected by the second means thereof to said intermediate portion.

4. A suspension system as defined by claim 3, wherein the one of said link members extends substantially longitudinally and the other of said link members extends substantially transversely.

5. A suspension system for a vehicle comprising:
   a steering knuckle for supporting a wheel used for steering;
   a steering arm connected to the steering knuckle at one end thereof and to a tie rod of a steering device at an opposite end thereof;
   an upper arm for connecting an upper portion of the steering knuckle to a frame of the vehicle; and
   a lower arm for connecting a lower portion of the steering knuckle to a frame of the vehicle;
   said lower arm comprising two link members, each of said link members being pivotally connected to the frame of the vehicle at one end thereof and to the steering knuckle at an opposite end thereof;
   said link members being disposed so as to (a) increase a distance from a connection point of the steering arm and the tie rod to a kingpin axis in response to an increase in a turning angle of the wheel used for steering when the wheel is turned in an outward direction so that the wheel is located radially outwardly in relation to a turning circle, and (b) reduce the distance in response to an increase in a turning angle of the wheel when the wheel is turned in an inward direction so that the wheel is located radially inwardly in relation to the turning circle;
   one of the two link members of said lower arm being disposed in a substantially transverse direction;
   the other of the two link members of said lower arm being disposed in a substantially longitudinal direction;

the two link members being disposed such that, in a plan view, an axis of the other of the link members crosses a portion of an axis of the one of the link members at an axis cross point disposed toward an outside of the vehicle, the axis cross point being located, during turning of the wheel, rearwardly of a vertical plane which includes the opposite end of the steering arm and extends in a transverse direction;

said steering arm being located forwardly of a center of the wheel.

6. A suspension system for a vehicle comprising:

a steering knuckle for supporting a wheel used for steering;

a steering arm connected to the steering knuckle at one end thereof and to a tie rod of a steering device at an opposite end thereof;

an upper arm for connecting an upper portion of the steering knuckle to a frame of the vehicle; and a lower arm for connecting a lower portion of the steering knuckle to a frame of the vehicle;

said lower arm comprising two link members, each of said link members being pivotally connected to the frame of the vehicle at one end thereof and to the steering knuckle at an opposite end thereof;

said link members being disposed so as to (a) increase a distance from a connection point of the steering arm and the tie rod to a kingpin axis in response to an increase in a turning angle of the wheel used for steering when the wheel is turned in an outward direction so that the wheel is located radially outwardly in relation to a turning circle, and (b) reduce the distance in response to an increase in a turning angle of the wheel when the wheel is turned in an inward direction so that the wheel is located radially inwardly in relation to the turning circle;

one of the two link members of said lower arm being disposed in a substantially transverse direction;

the other of the two link members of said lower arm being disposed in a substantially longitudinal direction;

the two link members being disposed such that, in a plan view, an axis of the other of the link members crosses a portion of an axis of the one of the link members at an axis cross point disposed toward an outside of the vehicle when the wheel is in a neutral position and so that the axis cross point is located, during turning of the wheel, rearwardly of a vertical plane which includes the opposite end of the steering arm and extends in a transverse direction;

said steering arm being located forwardly of a center of the wheel.

* * * * *